United States Patent [19]

Dupont et al.

[11] Patent Number: 4,982,916
[45] Date of Patent: Jan. 8, 1991

[54] EJECTOR SEAT SECURITY DEVICE FOR AIRCRAFT

[75] Inventors: Hoise Dupont, Colombes; Gerard Dupin, Clamart, both of France

[73] Assignee: Avions Marcel Dassault-Breguet Aviation, Vaucresson, France

[21] Appl. No.: 361,305

[22] Filed: Jun. 5, 1989

[30] Foreign Application Priority Data

Jun. 7, 1988 [FR] France .................. 88 07538

[51] Int. Cl.$^5$ ............................................ B64D 25/115
[52] U.S. Cl. ............................................. 244/122 AF
[58] Field of Search ........ 244/122 R, 122 A, 122 AE; 89/1.14

[56] References Cited

U.S. PATENT DOCUMENTS

| | | | |
|---|---|---|---|
| 2,853,258 | 9/1958 | Polleys | 244/122 A H |
| 3,083,938 | 4/1963 | Brinkworth et al. | 244/122 A H |
| 3,214,117 | 10/1964 | James et al. | 244/122 A |
| 3,281,097 | 10/1966 | Tienne | 244/122 A E |
| 3,420,176 | 1/1969 | Pope | 102/207 |
| 4,570,879 | 2/1986 | Dupin | 244/122 A F |
| 4,706,909 | 11/1987 | Cuevas | 244/122 A C |

FOREIGN PATENT DOCUMENTS

| | | |
|---|---|---|
| 1578274 | 8/1969 | France . |
| 2040025 | 8/1980 | United Kingdom . |
| 2088928 | 6/1982 | United Kingdom . |
| 2120612 | 12/1983 | United Kingdom . |

OTHER PUBLICATIONS

Douglas Aircraft Company, Aces II Advanced Concept Ejection Seat, 9/78.

Primary Examiner—Charles T. Jordan
Assistant Examiner—Rochelle Lieberman
Attorney, Agent, or Firm—Watson, Cole, Grindle & Watson

[57] ABSTRACT

An ejector seat device for aircraft includes a support structure which is adapted to be mounted in an aircraft and which can be ejected in an emergency, a seat connected to the support structure, a harness system which is capable of keeping a person in the seat and which comprises a recall device to immobilize the person in a suitable position at the moment of ejection, at least one pyrotechnical catapult capable of ejecting the support structure and the seat, together with a person sitting on the seat, out of the aircraft, a device for at least weakening the aircraft canopy by shock wave, a control handle, and an initiator connector to the handle for transforming a pull on the handle into a pyrotechnical signal. The pyrotechnical signal from the handle is transmitted in the form of a shock wave to the harness recall device and to the catapult.

6 Claims, 3 Drawing Sheets

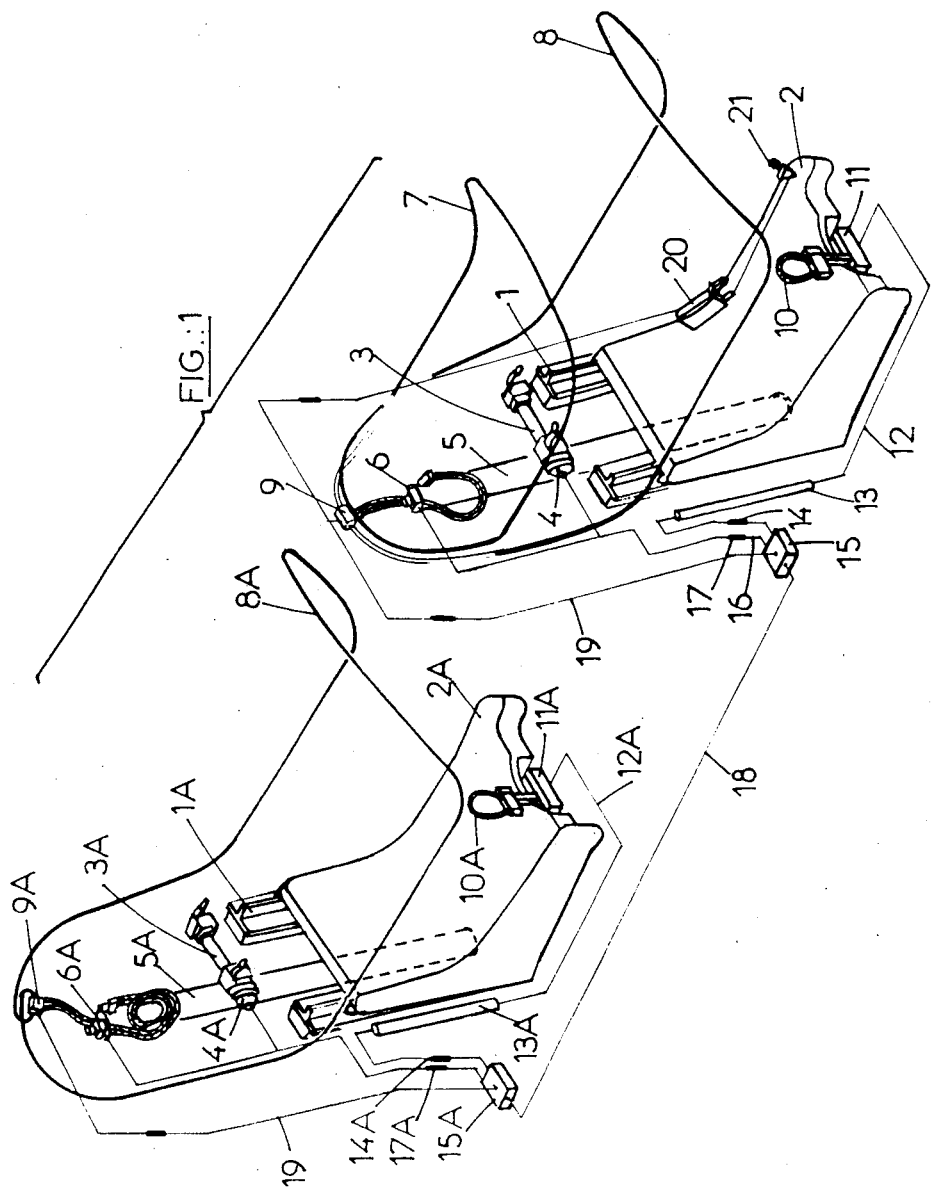

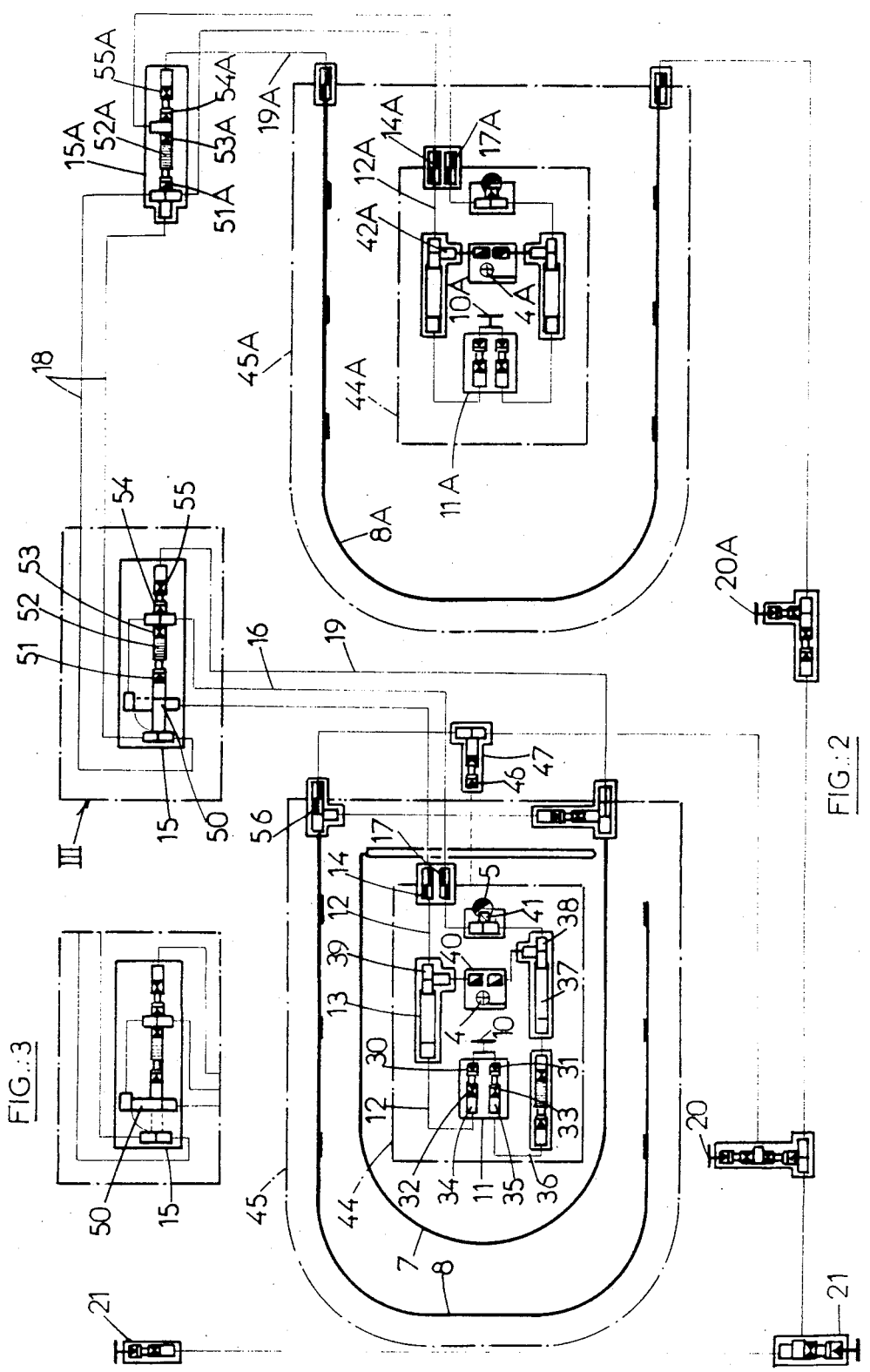

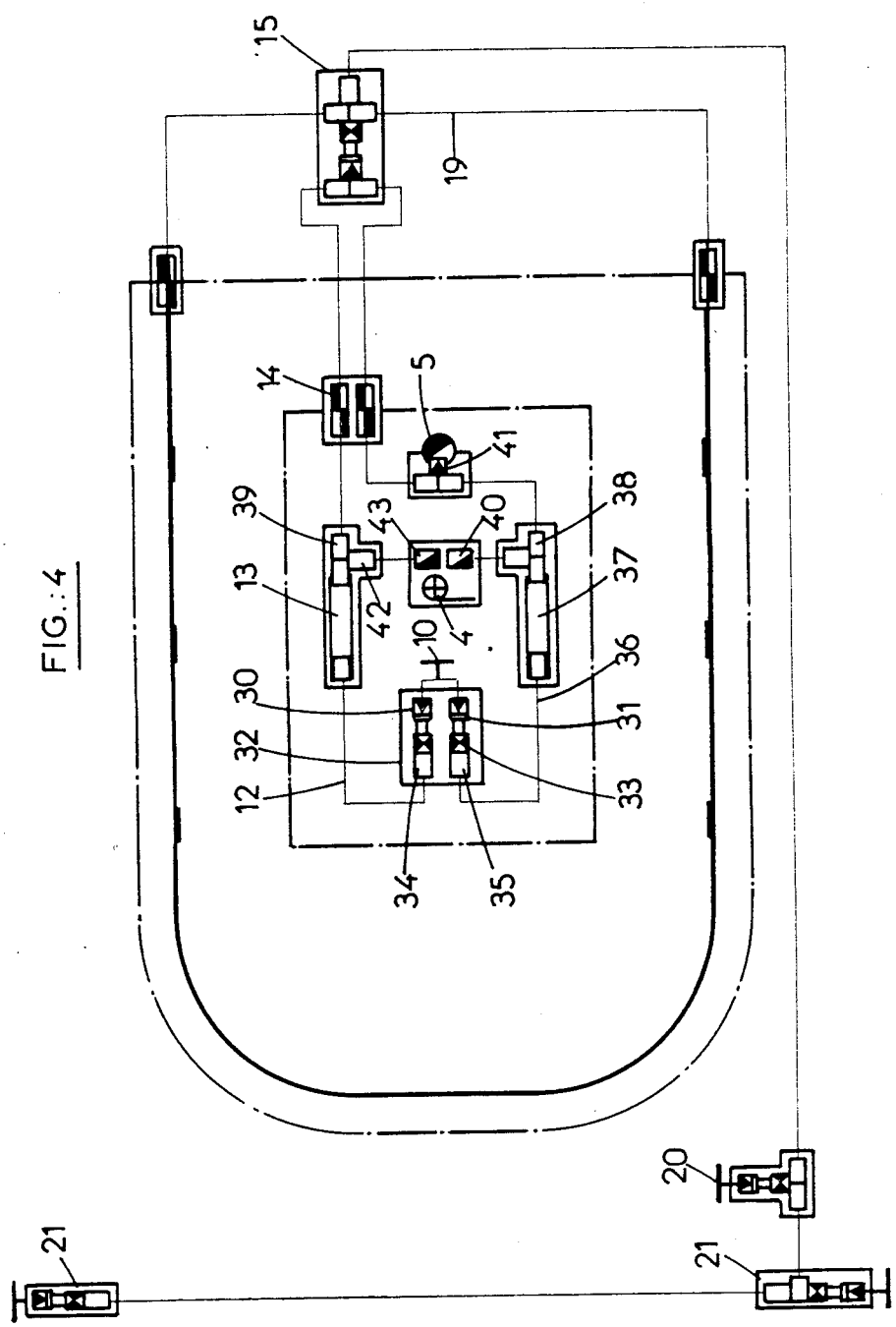
FIG.:4

EJECTOR SEAT SECURITY DEVICE FOR AIRCRAFT

INTRODUCTION (a) Field of the Invention

The present invention relates to an ejector seat security device for aircraft.

(b) Background of the Invention

Ejector seat devices are complex assemblies which comprise in particular:

a support structure which is mounted in the aircraft and which can be ejected in an emergency, a bucket seat fixedly connected to the support structure but which is capable of having its position adjusted in relation to the support structure, a harness system capable of keeping a person in the bucket seat, and comprising recall means to immobilise this person in a suitable position at the moment of ejection, at least one pyrotechnical catapult capable of ejecting the assembly formed by the support structure, the bucket seat and the person out of the aircraft, means for controlling and effecting a series of operations subsequent to ejection, in particular separation of the pilot and the bucket seat, and releasing the parachutes, a control handle connected to means for transforming a pull on the handle into a pyrotechnical signal, and means for transmitting this pyrotechnical signal at least to the recall means of the harness and to the catapult.

The ejector seat is also associated with a device for at least weakening the aircraft canopy by shock waves.

In the devices now used the operations subsequent to ejection are also controlled by pyrotechnical methods in a system which comprises delay means and which is installed on the support structure. The control of the canopy weakening device comprises a mechanical intermediary: the displacement of the support structure at the start of ejection activates, by the intermediary of a connecting rod, a pin which controls the weakening process.

The system is complicated further when two people are to be evacuated at the same time. It is then necessary for the pyrotechnical signal emanating from the control handle to activate to eject the two occupants but with a sufficient time delay to prevent them colliding. They pyrotechnical signal must, in this case, proceed by fixed conduits in the aeroplane to go from one seat to the other, passing through a sequencing device which acts in a different manner dependent on whether the signal is triggered by the occupant of the first or the second seat, or if the second seat is unoccupied.

It is known that the usual pyrotechnical signals are of two principal types: those which call on a pressure wave and in consequence travel at a speed which is close to that of sound, and those which call on a shock wave, which travel at a supersonic speed. Normally the signal emitted by the control handle is a pressure wave signal. It is transmitted by interconnected tubes with the intervention of pyrotechnical relays, that is, cartridges which, on receiving a pressure wave, are released to emit a new pressure wave more powerful than that which they have just received. In this manner the effects of extinction of the pressure wave by the effect of cooling, losses in charge and growth of the occupied volume are avoided. The control of the canopy weakening device is, on the contrary, of the shock wave type: the displacement of the small connecting rod connected to the support structure acts in fact directly on a detonator connected to a detonating cord provided in the canopy.

The pyrotechnical signals in the form of pressure waves have a number of disadvantages: for good transmission they require that the conduits in which they circulate are air-tight so as to avoid losses in pressure likely to weaken the signal. In a complex installation this requires that all of the joints between elements of the conduit are properly mounted and controlled each time they are dismantled or reassembled. Moreover the inevitable weakness of the circuit makes the presence of a number of relay cartridges necessary, which cause an increase in weight which is relative to the complexity of the system and the length of the conduits.

The object of the present invention is to provide a system which is at the same time easy to maintain and control and which is lighter, whilst being at a lower total cost price.

SUMMARY OF THE INVENTION

To achieve this object the invention provides an ejector seat security device for aircraft, comprising a support structure which is adapted to be mounted in an aircraft and which can be ejected in an emergency, a seat fixedly connected to the support structure but capable of adjustment relative to the support structure, a harness system which is capable of keeping a person in the seat and which comprises recall means to immobilise the person in a suitable position at the moment of ejection, at least one pyrotechnical catapult capable of ejecting an assembly formed by the support structure, the seat and the person out of the aircraft, means for controlling and effecting a series of operations subsequent to ejection, more particularly separation of the pilot and the seat and releasing the parachutes, a device for at least weakening the canopy by shock wave, a control handle and means connected to the handle for transforming operation of the handle into a pyrotechnical signal, and means for transmitting this pyrotechnical signal at least to the recall means of the harness and to the catapult, the pyrotechnical signal from the handle to the recall means of the harness and to the catapult being of the shock wave type.

The means for transmitting a pyrotechnical signal of the shock-wave type are, obviously, different from those which serve to transmit a pyrotechnical signal of the pressure wave type. They essentially comprise a detonating cord formed by stretching a metallic tube which is first filled with a suitable explosive material. The diameter of such a detonating cord can be as small as 1.5 mm. The detonating cord is placed inside a flexible or rigid tube of a diameter which may be only 8 mm if it is flexible and similarly 4 mm if it is rigid, which serves essentially for its protection. The joining of elements of the detonating cord is carried out by putting the ends of lumps of explosive contained inside metallic tubes at a sufficiently small distance apart. It is not necessary for the protective tubes to be connected to each other in an air-tight manner.

In accordance with a particularly interesting embodiment of the invention, the pyrotechnical signal of the shock wave type is also sent in this form to the canopy weakening device. With regard to the prior art, the mechanical relay constituted by a small connecting rod which is activated by the displacement of the ejector seat itself is thus avoided. Weight is therefore gained and an appreciable time gain is achieved.

Preferably, in this case, one part of the means for transmitting the pyrotechnical signal from the handle to the canopy weakening device is mounted on the aircraft itself, and another part is integral with the support structure for starting by the handle itself. The connection between these two parts is advantageously made by means of one or more auto-connectors. By auto-connectors a simple device is intended of the plug in type, by means of which the end of a detonating cord proceeds to branch off in the manner of a wall plug on the extension of another detonating cord. Contrary to the technique of the pressure-wave pyrotechnical signals, there is no need to achieve an air-tight connection by means of a screwed joint. The device can therefore be achieved in such a way that the installation in the aircraft of a seat, with its support structure, carries out automatically and without supplementary operations, the connection of the parts of the pyrotechnical circuit. One thus obtains an appreciable gain in simplicity and security. In particular, taking off a seat in order to replace it by another can be carried out very easily and without the risk of error.

Other simplifications arise when the aircraft is furnished with several ejector seats. In the classic manner, an aircraft with two (or more) ejector seats comprises means for transmitting pyrotechnical signals between the two seats. These means are partly assembled on the aircraft and partly assembled on the ejector seats. It is advantageous for these means to be also provided for transmitting pyrotechnical signals of the shock wave type and to be connected to the means connecting the handle for each seat to the recall means of the harness and the catapult. A notable simplification of the circuits is thus obtained. It will be understood that in this case it is advantageous for the parts of the transmission means which are mounted on the aircraft and those which are mounted on the ejector seats to be connected by auto-connectors.

Another advantage of the process in this case is that the sequencer which controls the successive departure of the ejector seats, with predetermined time intervals, can be omitted because the gas cartridges of traditional systems are replaced by detonators of significantly lower volume and weight.

Advantageously the canopy weakening devices are connected by means of pyrotechnical signal transmission means between two ejector seats by transmission means mounted entirely on the aircraft. A new simplification is thus obtained and a new omission.

The present invention will now be explained in more detail with the aid of practical examples illustrated by the drawings.

BRIEF DESCRIPTION OF THE DRAWINGS

FIG. 1 is a schematic view of an assembly showing a security device with two ejector seats.

FIG. 2 is a schematic view of the connections for a two-seater aeroplane with two occupants.

FIG. 3 is a section of the same schematic view according to the arrow III showing the case of a single occupant.

FIG. 4 is an analogue schematic view for a one-seater aeroplane.

DESCRIPTION OF THE PREFERRED EMBODIMENTS

The device described in FIG. 1 shows, in a very schematic manner, a system with two ejector seats, the elements belonging to the second seat being identical, in principle, to those of the first seat and carrying the same references followed by the suffix A. Reference 1 denotes the support structure which principally comprises two beams orientated close to the vertical and fixed on an aeroplane which is not shown. Reference 2 denotes a bucket seat which is fixedly connected to the support structure but can be raised or lowered along the support structure so as to place the eyes of the pilot in a fixed position in relation to the aeroplane and in particular to the piloting devices and target. Reference 3 denotes the harness system comprising in particular security straps which are worn on the shoulders of the pilot and which can, in normal use, permit him some freedom of movement, but which, thanks to a pyrotechnically-controlled rapid recoil device 4, can be held taut at the moment of ejection so as to place the spine of the pilot in a suitable position to withstand the acceleration caused by ejection.

Reference 5 designates a pyrotechnical catapult with a priming device 6. This telescopic catapult is fixed by one of its ends to the support structure 1 and by its other end to the aeroplane structure.

For reasons of clarity in the figure the other accessory elements of the ejector seat have been omitted, that is, the spindles which extend the action of the catapult once the ejector seat is outside the aeroplane, the means for freeing the pilot from the seat, as well as the parachutes and the means for activating them.

All the elements just described are found on ejector seats which are already known.

The darkened lines 7 and 8 symbolise a device for at least weakening the transparent canopy (by weakening the canopy we mean embrittlement of the canopy or rendering the canopy frangible); conforming to patents FR-A-2,077,846 and 2,542,697. These patents describe a system in which the canopy is weakened by a series of explosive charges placed according to a defined pattern and connected to each other by detonating cord. The first of the lines 7 and 8 corresponds to the separation of the part of the canopy situated above the head of the pilot and the second to the separation of the rest of the glass which occurs with a calculated delay in relation to the first separation. The canopy weakening devices are controlled by a pyrotechnical activator 9 capable of providing a suitable delay.

The reference 10 denotes an ejection control handle, situated in front of the bucket seat 2. This handle is connected to an "initiator" 11 which transforms a pull on the handle into a pyrotechnical signal and which comprises a pin and a detonator in known manner.

There is now described means for transmitting the pyrotechnical signal emitted by the pin of the initiator 11 of the front seat, or that of the initiator 11A of the rear seat. A first "pyrotechnical conductor" 12 leads away from the initiator 11, it enters a telescopic tube 13 and terminates at a first auto-connector 14. The telescopic tube is intended to initiate the relative displacements of the bucket seat 2, to which the initiator 11 is fixed, and the part of the auto-connector 14 which is connected to this initiator through the intermediary of the conductor 12, and which is integral with the support structure 1. The second part of the auto-connector 14 is, for its part, integral with the aeroplane itself. This second part is connected to a transfer centre 15 mounted on the aeroplane.

From this centre 15, the functions of which will be described in more detail, there emanates a first pyrotechnical conductor 16 connected to an auto-connector 17 whose second part, integral with the support structure 1, transmits the pyrotechnical signals to the control heads of the re-coil device of the belt 4 and the catapult 5. A second pyrotechnical conductor 18 emanates from the transfer centre 15 and connects the transfer centre 15 to a similar transfer centre 15A, associated with the second ejector seat. A third pyrotechnical conductor 19 emanates from the transfer centre 15 and connects with the command member 9 of the circuit for weakening the canopy.

Moreover the command member 9 of the canopy weakening circuit is connected by other pyrotechnical conductors to a "crash" control handle 20, which is situated within reach of the pilot and which permits him to weaken the canopy without activating the ejector seat, and to external handles 21 which permit rescuers to carry out the same operation from the outside of the aeroplane.

FIG. 1 is a very simplified schematic view in which a large number of elements intended in particular to ensure a suitable redundancy to the controls have been voluntarily suppressed.

FIGS. 2 and 4 are more complete schematic views of the system. The control handle 10 is again shown and the initiator 11 or 11A is shown to contain two pins 30, 31 each joined to a detonator 32, 33 and to a reinforcing endpiece 34, 35. One of the reinforcing endpieces denoted by reference 34 is connected to the pyrotechnical conductor 12 and by this to the telescopic tube 13 and to the first auto-connector 14. The second reinforcing endpiece 35 is connected to another pyrotechnical conductor 36, associated with a second telescopic tube 37 and which, thanks to two reinforcing endpieces 38 and 39, controls the recoiling of the straps 4 through the intermediary of a gas endpiece 40 and the catapult 5 through the intermediary of a pin 41. Another reinforcing endpiece 42, mounted on the pyrotechnical conductor 12, controls the recoiling of the straps 4 through the intermediary of another gas endpiece 43.

In FIGS. 2 and 4 the broken lines 44, 44A surround the elements which are secured to the support structure 1 2, and the lines 45, 45A surround the elements which are secured to the canopy, that is, all those which are not intended to remain on the aeroplane at the time of ejection.

In FIG. 2 two canopy weakening elements 7 and 8 are shown for the first seat and a single element 8 is shown for the second seat on the same figures, as on FIG. 4, which corresponds to the one-seater version. In FIG. 2 the first seat is furnished with a second circuit for releasing the weakening of the canopy comprising a pin 46 joined to a detonator 47, and to the reinforcing endpieces inserted on the pyrotechnical control circuit which connects the handles 20, 21 to the circuits for weakening the canopy. The anti-return transfer centre has a different structure according to whether the aeroplane is a one or two seater. Furthermore, in the case of a two-seater aeroplane, the transfer centre 15A connected to the second seat is slightly different from that which is connected to the first seat. The transfer centre 15 comprises a movable rocker 50 which can occupy two positions. In a first position, illustrated in FIG. 2, it transmits the impulse emanating from the auto-connector 14 at once to the line 18 which is connected by a primer to a delay device 52. The delay, in the described example, is 515 milli/seconds. Beyond this delay device there is a detonator 53 which is connected for the one part to a pyrotechnical conductor 16 and to the auto-connector 17, and for the other part by a pin followed by a primer and a detonator 55, to the line 19 controlling the means 7, 8, 9 for weakening the canopy and which is connected to the aforesaid means by an auto-connector 56.

The transfer centre 15A ensures a direct connection between the line 12A and the auto-connector 14A and the lines 18 which join it to the centre 15. Furthermore, through the intermediary of a detonator 51A of a delaying device 52A which introduces a delay of 170 milli/seconds in the described example, and of a detonator 53A, it is connected to the auto-connector 17A. It is, moreover, connected by a pin 54A, a primer and a detonator to the circuit 19, 7, 8 for weakening the canopy.

FIG. 3 relative to the case of a two-seater aeroplane with only one occupant shows the transfer centre 15 with the rocker 50 in a position which ensures the isolation of the second seat and direct transmission of the impulses from the auto-connector 14 to the auto-connector 17.

The rocker 50 is controlled by a lever within reach of the hand of the occupant of the first seat. By means of this device, in the case of a two-seater aeroplane with two occupants, the first ejector seat is released immediately when its occupant pulls on the handle, and the second seat is released after approximately half a second, and when the occupant of the second seat pulls the handle, the first seat is ejected immediately and the second after approximately 1/5 second. Where there is only one occupant ejection is always instantaneous with of course the necessary delays for the different sequences of the operation which are not detailed here.

An important advantage of the invention is that the installment of a seat or canopy, after dismounting, does not necessitate reconstituting and checking the airtightness of joints between pipes, because normally the auto-connectors, as their name implies, are connected automatically on installment and visual checking is quick and reliable.

What is claimed is:

1. In an ejector seat security device for aircraft having a canopy, comprising a support structure which is adapted to be mounted in an aircraft and which can be ejected in an emergency, a seat fixedly connected to the support structure but capable of adjustment relative to the support structure, at least on pyrotechnical catapult capable of ejecting an assembly formed by the support structure, the seat and a person sitting in the seat out of the aircraft, a harness system which is capable of keeping a person in the seat and which comprises recall means to immobilise the person in a suitable position when the assembly is ejected from the aircraft, means for controlling and effecting a series of operations subsequent to ejection, a canopy-weakening device for at least weakening the canopy by a shock wave, a control handle and means connected to the handle for transforming operation of the handle into a pyrotechnical signal, and first signal transmission means for transmitting this pyrotechnical signal at least to the recall means of the harness and to the catapult, the improvement wherein said first signal transmission means comprises a detonating cord for transmitting said pyrotechnical signal as a shock wave.

2. A device according to claim 1, wherein said first transmission means also comprises a detonating cord for transmitting the pyrotechnical signal as a shock wave to said canopy-weakening device.

3. A device according to claim 2, wherein a part of said first transmission means which transmits the pyotechnical signal from the handle to the canopy-weakening device is mounted on the aircraft itself and a second part is secured to the support structure, and a connection between said first and second parts is made by means of at least one auto-connector.

4. A device according to claim 1 further comprising second transmission means for transmitting pyrotechnical signals between at least two ejector seats in an airplane having respective canopies and respective canopy-weakening devices, said second transmission means being at least partly mounted on the aircraft and partly mounted on the ejector seats, said second transmission means including a detonating cord for transmitting pyrotechnical signals as a shock wave, said second transmission means being connected to first transmission means for each seat.

5. A device according to claim 4, wherein said parts of said second transmission means which are mounted on the aircraft and said parts which are mounted on the ejector seats are connected by auto-connectors.

6. A device according to claim 4, wherein said parts of said first and second transmission means which transmits pyrotechnical signals to said canopy-weakening devices are mounted entirely on the aircraft.

* * * * *